United States Patent [19]

Kastelic

[11] Patent Number: 4,879,358

[45] Date of Patent: Nov. 7, 1989

[54] PROCESS FOR FLUORINATING LINEAR ALTERNATING POLYKETONE POLYMERS AND ARTICLES PRODUCED THEREFROM

[75] Inventor: John R. Kastelic, Katy, Tex.

[73] Assignee: Shell Oil Company, Houston, Tex.

[21] Appl. No.: 250,884

[22] Filed: Sep. 29, 1988

[51] Int. Cl.$^4$ .............................................. C08G 67/02
[52] U.S. Cl. .................................... 525/539; 428/457; 428/480; 428/523; 528/392
[58] Field of Search ........................ 528/392; 525/539; 428/457, 480, 523

[56] References Cited

U.S. PATENT DOCUMENTS

| | | | |
|---|---|---|---|
| 2,495,286 | 1/1950 | Brubaker | 260/63 |
| 3,694,412 | 9/1972 | Nozaki | 260/63 |
| 4,593,050 | 6/1986 | Cohen et al. | 522/2 |

FOREIGN PATENT DOCUMENTS

| | | |
|---|---|---|
| 121965 | 10/1984 | European Pat. Off. . |
| 181014 | 5/1986 | European Pat. Off. . |
| 1081304 | 8/1967 | United Kingdom . |

Primary Examiner—Harold D. Anderson
Assistant Examiner—T. Mason

[57] ABSTRACT

A process for treating a linear alternating polymer of carbon monoxide and at least one ethylenically unsaturated hydrocarbon with a fluorine to thereby affect the water vapor transmission rate through the polymer, as well as articles and laminar structures produced by that process.

19 Claims, No Drawings

PROCESS FOR FLUORINATING LINEAR ALTERNATING POLYKETONE POLYMERS AND ARTICLES PRODUCED THEREFROM

FIELD OF THE INVENTION

This invention is concerned with a process for fluorinating the surface of an object from a linear alternating polymer of carbon monoxide and at least one ethylenically unsaturated hydrocarbon. The invention relates to objects prepared from linear alternating polymer of carbon monoxide and at least one ethylenically unsaturated hydrocarbon having surface fluorination with corresponding improved water vapor transmission rates.

BACKGROUND OF THE INVENTION

The general class of polymers of carbon monoxide and one or more ethylenically unsaturated hydrocarbons has been known for some years. Brubaker, U.S. Pat. No. 2,495,286, produced such polymers of relatively low carbon monoxide content in the presence of free radical initiators such as benzoyl peroxide. British Patent 1,081,304 produced such polymers of higher carbon monoxide content in the presence of alkylphosphine complexes of palladium as catalyst. Nozaki extended the process to produce linear alternating polymers in the presence of arylphosphine complexes of palladium. See, for example, U.S. Pat. No. 3,694,412.

More recently, the class of linear alternating polymers of carbon monoxide and at least one ethylenically unsaturated hydrocarbon has become of greater interest in part because of the availability of the polymers. These polymer, often referred to a polyketone or polyketone polymers have been shown to be of the repeating formula —CO—(A)— where A is the moiety of an ethylenically unsaturated hydrocarbon polymerized through the ethylenic unsaturation. For example, when the ethylenically unsaturated hydrocarbon is ethylene the polymer will be represented by the repeating formula —CO—($CH_2$—$CH_2$)—. The general process for the more recent production of such polymers is illustrated by a number of published European Patent Applications including 121,965 and 181,014. These process typically involves a catalyst composition formed from a compound of the group VIII metals palladium, cobalt or nickel, the anion of a strong non-hydrohalogenic acid having a pKa below 6 and a bidentate ligand of phosphorus, arsenic or antimony.

The resulting polymers are relatively high molecular weight thermoplastics having utility in the production of shaped articles such as containers for the food and drink industry. For some particular applications it has been found to be desirable to have properties of a polymeric composition modified to reduce water vapor through the polymer. The present invention provides a process for treating the polymer so as to retain the more desirable properties of the polyketone polymer and yet improve other properties.

SUMMARY OF THE INVENTION

The present invention is a process for treating a linear alternating polymer of carbon monoxide and at least one ethylenically unsaturated hydrocarbon with fluorine wherein said treatment process reduces the rate of water vapor transmission through the polymer.

The present invention is an article prepared from a linear alternating polymer of carbon monoxide and at least one ethylenically unsaturated hydrocarbon which has been subjected to fluorination. The present invention relates to a process for fluorinating the novel polymer wherein said process comprises the following steps:

(i) disposing a linear alternating polymer of carbon monoxide and at least one ethylenically unsaturated hydrocarbon in a chamber;

(ii) at least once, flushing said chamber with nitrogen;

(iii) at least once, exposing said polymer to a gas mixture thereby forming treated polymer, using a temperature sufficient to cause a reaction, and wherein said mixture comprises a nitrogen and a fluorine gas, and wherein the fluorine gas is present in amounts up to 100% by volume based on the total volume of the gas mixture;

(vi) at least once after exposing said polymer to said gas mixture, flushing said chamber with nitrogen; and (v) removing said treated polymer from said chamber.

The present invention relates to a fluorination of pellets or particles of the novel polyketone polymer using the type of procedure as described above and then forming said pellets into objects capable of improved water vapor transmission rates. The invention also relates to a process for fluorinating a novel polyketone composition during thermoforming, solid phase pressure forming, or blow molding of the polymer into a container or object.

DETAILED DESCRIPTION OF THE INVENTION

The polyketone polymers which are employed in this invention are linear alternating polymers of carbon monoxide and at least one ethylenically unsaturated hydrocarbon. Suitable ethylenically unsaturated hydrocarbons for use as precursors of the polyketones polymers have up to 20 carbon atoms inclusive, preferably up to 10 carbon atoms inclusive, and are aliphatic such as ethylene and other α-olefins including propylene, butylene, isobutylene, 1-octene, and 1-dodecene, or are arylaliphatic containing an aryl substituent on an otherwise aliphatic moiety, particularly an aryl substituent on a carbon atom of the ethylenic unsaturation. Illustrative of this latter class of ethylenically unsaturated hydrocarbons are styrene, p-methylstyrene, p-ethylstyrene and m-methylstyrene. Preferred polyketones are copolymers of carbon monoxide and ethylene or terpolymers of carbon monoxide, ethylene and a second ethylenically unsaturated hydrocarbon of at least 3 carbon atoms, particularly an α-olefin such as propylene.

The structure of the polyketone polymer is that of a linear alternating polymer of carbon monoxide and at least one ethylenically unsaturated hydrocarbon and the polymer will contain substantially one moiety of carbon monoxide for each moiety of unsaturated hydrocarbon. When terpolymers of carbon monoxide, ethylene and a second hydrocarbon are employed in the blends of the invention there will be, within the terpolymer, at least two units incorporating a moiety of ethylene for each unit incorporating a moiety of the second hydrocarbon, preferably from about 10 units to about 100 units incorporating a moiety of ethylene for each unit incorporating a moiety of the second hydrocarbon. The polymer chain is therefore represented by the formula

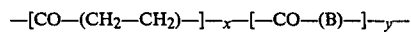

where B is the moiety obtained by polymerization of the second hydrocarbon through the ethylenic unsaturation. The —[—CO—(CH$_2$—CH$_2$)— units and the —CO—(B)— units are found randomly throughout the polymer chain. In the modification of the invention where copolymers of carbon monoxide and ethylene are employed as a blend component and there is no second hydrocarbon in the polymer chain, the polymer is represented by the above formula wherein y=0. If y is other than 0, i.e., terpolymers are employed, ratios of y:x should be no more than 0.5 and preferably from about 0.01 to about 0.2 are preferred. The end groups or "caps" of the polymer chain will depend on what materials were present during the preparation of the polyketone polymer and whether and how the polymer was purified. The precise properties of the polymer will not depend to any considerable extent upon the particular end groups so that the polymer is fairly represented by the above formula for the polymer chain.

Of particular interest are those polyketones of high molecular weight from about 1,000 to about 500,000, especially those of molecular weight over 10,000. The physical properties of the polyketone polymers will depend in part on the molecular weight of the polymer, whether the polymer is a copolymer or a terpolymer and the proportion of the second hydrocarbon present in the case of a terpolymer.

Typical melting points are from about 175° C. to about 300° C., more typically from about 180° C. to about 285° C. Polyketone polymers usable herein may have melting points of between about 190°–230° C. and polymers with melting points ranging from about 230° C. to about 270° C. may be usable herein.

Useful polyketones for the present invention have limiting viscosity numbers (LVN) as measured by the method wherein the polymer is dissolved in metacresol at 60° C.; using a standard capillary viscosity measuring device, such as a Cannon-Ubbelohde viscometer in the range of 0.5 to 10 LVN and more preferably 0.8 to 4 LVN and most preferably 0.8 to 2.5 LVN.

A method of producing the polyketone polymers which is now becoming conventional is to contact the carbon monoxide and ethylenically unsaturated hydrocarbon(s) in the presence of a palladium compound, the anion of a non-hydrohalogenic acid having a pKa below about 6 and a bidentate phosphorus ligand. The scope of the process of polyketone production is extensive but, without wishing to be limited, a preferred palladium compound is a palladium carboxylate, particularly palladium acetate, the preferred anion is the anion of trifluoroacetic acid or p-toluenesulfonic acid, and the preferred bidentate ligand is 1,3-bis(diphenylphosphino)propane or 1,3-bis[di(2-methoxyphenyl)-phosino]propane. Such a process for polyketone production is illustrated by copending U.S. patent application Ser. No. 930,468, filed Nov. 14, 1986.

Polymerization is conducted in a gas phase in either the absence of diluent of the substantial absence of diluent or in a liquid phase in the presence of an inert diluent such as an alkanol, e.g., methanol or ethanol. The reactants are contacted under polymerization conditions in the presence of the catalyst composition by conventional methods such as shaking or stirring. Suitable reaction temperatures are from about 20° C. to about 150° C., preferably from about 50° C. to about 135° C. Typical reaction pressures are from about 1 bar to about 200 bar, more typically from about 10 bar to about 100 bar. Subsequent to reaction the polymer product is recovered as by decantation or filtration. The polymer product may contain residues of the catalyst which are removed, if desired, by treatment with a solvent or a complexing agent which is selective for the residues. After the polymer is recovered, an amount of stabilizer, such as Ethanox ™ 1010 can be added to the recovered filtered material or recovered decanted material. The stabilizer can be prepared by forming a slurry using the liquid compatible with the liquid used in the polymerization reaction. The formed slurry containing stabilizer is added to the recovered filtered or decanted material forming a polymer/stabilizer mixture. The mixture is then dried forming a powder. The powder can then be processed by conventional means into pellets, molded articles, or extruded articles. The stabilizer can be added to the polymer in amounts up to 10% by weight, though stabilizer can be added in a more preferred range or up to 5% by weight, with a range of 0.1 to 3% by weight being most preferred.

Conventional additives, include stabilizers, inhibitors of oxidative, thermal and ultraviolet degradation; lubricants and mold release agents; fire resistant materials; colorants including dyes and pigments, and other substances, such as fillers, extenders, and reinforcements can be added to modify the polymer. The additives can be incorporated into the polymer at any stage in the preparation.

The polymer can be processed with additive by pouring the polymer into a feeder attached to a 15 mm co-rotating twin screw extruder, such as one made by Baker Perkins, though other extruders, like a 30 mm twin screw extruder by Werner and Pfleiderer extruder may also be used. The feed can be run at different rates without affecting the resultant product. The polymer can be starve fed (fed at less than the capacity of the feeder) or flood fed (fed at more than the capacity of the feeder) into the extruder simultaneously with or by sequential addition using the optional additive. The extruder can be run at a variety of speeds, though an extruder speed of 200–300 rpm was preferred when a 15 mm extruder was used. The extruder was run at a preferred temperature for melt compounding which depended on the melting point of the polymer. Usually a temperature between 10° to 100° above the melting point of the polymer was used. A preferred temperature range for the extruder was between about 175° C. and 300° C. After compounding, the resulting extruded strand was quenched in water at room temperature, then fed into a chopper to form pellets.

Formed polymer pellets were used for batch fluorination forming treated pellets. The treated pellets were then processed to make articles or containers using processing procedures, such as solid phase pressure forming (SPPF), a processing technique used by Shell Chemical Co. of Houston, Tex., or thermoforming. Processing techniques to form the novel articles like SPPF and also thermoforming, are disclosed in John Florian's book, *Practical Thermoforming Principles and Applications*, published by Marcel Dekker Inc., NYC, 1987, particularly on page 164 and in Chapter 3. It is possible that the articles formed from the treated pellets may be subjected to further fluorination treatments to obtain additional enhanced water vapor transmission rates.

Alternatively the pellets prior to flourination, can be processed into articles and then the articles can be exposed to one or more fluorination treatments forming treated articles with improved water vapor transmission rates.

Fluorine/nitrogen gas mixtures usable in the novel fluorination process have at least 0.1–99.9% (by volume) of fluorine present in the fluorine/nitrogen gas mixture, though at room temperature and under laboratory conditions gas mixtures with 1 to 15% by volume of fluorine are preferred with amounts of 1–10% by volume of fluorine being most preferred. It should be noted that when elevated temperatures or large amounts of fluorine are used in the fluorination process, the reaction may become uncontrollable. It is important to balance the volume of fluorine with the temperature of the reaction.

In one embodiment, novel polyketone polymer was formed as described above then prepared into pellets which were, in turn, molded into plaques 4"×4" (l×w) and 5 to 30 mils thick. The plaques were molded at 245° C. for 1½ minutes, using a Carver hydraulic press. The plaques were fluorinated by following a process which involved first placing the plaques in a steel reaction vessel. The steel vessel was maintained at room temperature, at about 60°–80° F., and at about 1 atmosphere pressure. After disposing the polymer plaques in the vessel, the vessel, was flushed with nitrogen. After the nitrogen flushing was complete, the plaques were exposed to a fluorine/nitrogen gas mixture, for a defined period of time (a residence period). The fluorine exposure was accomplished by blowing fluorine/nitrogen gas into the chamber at a pressure to maintain a pressure of 1 atmosphere within the chamber. It is within the scope of this invention to use different pressures and temperatures and still accomplish proper fluorination of the polymer. After the residence period passed, the chamber was evacuated of the gas mixture and purged with nitrogen, to remove remaining fluorine or hydrofluoric acid reaction product. After purging, the chamber and the plaques were removed and tested as described in the Table which follows.

Fluorination treatment can occur at varying temperatures, such as at extremely low temperatures, or at temperatures above the melting point of the polymer. The temperature used depends on the amount of fluorine used in the treatment and the time period in which the polymer is exposed to the fluorine gas, as well as the amount of fluorine treatment desired based on the intended use for the article. It is preferred that at elevated temperatures, such as at temperature near the melting point of the polymer, small amounts of fluorine are used in the treatment process.

As alternative embodiments, it is contemplated that fluorination of the novel polyketone material can be performed during thermoforming of the novel composition or during blow molding of the novel composition, or during solid phase pressure forming of the novel composition. It is contemplated that fluorination may be accomplished by replacing the gas normally used in association with these processing techniques with the described fluorine/nitrogen gas mixture and thereby complete the fluorination of the composition in one step.

In other embodiments, it has been discovered that films can be prepared from the novel polymer and treated by the fluorination process to produce films, that demonstrate good water vapor transmission rates with no change in color or transparency and retaining their flexibility during manual examination after fluorination.

It is contemplated that fluorinated polyketone polymer may be further disposed on a substrate, such as polypropylene, polybutylene, aluminum foil, polyester, crystalline or semi-crystalline α-olefin polymers, or metals to form laminar structures which have good strength and stiffness, as well as unexpected improved resistance to water vapor transmission.

Variations to this process may be made and yet remain within the scope of the invention. For example, it is possible that inert gases other than nitrogen, or gases such as air can be used to purge the fluorination chamber.

The following Illustrative embodiments are not intended to limit the scope of the present invention and are provided to assist in clarifying the invention.

ILLUSTRATIVE EMBODIMENTS

Various experiments were performed on particular polyketone polymers, identified as Polymer A, and Polymer B, respectively.

POLYKETONE POLYMER A

A linear alternating terpolymer of carbon monoxide, ethylene and propylene was produced in the presence of a catalyst composition formed from palladium acetate, the anion of trifluoroacetic acid and 1,3-bis[di(2-methoxyphenyl)phosphino]propane. The melting point of the polymer was 221° C. and the polymer had a limiting viscosity number (LVN) of 1.00 when measured in m-cresol at 60° C.

POLYKETONE POLYMER B

A linear alternating terpolymer of carbon monoxide, ethylene and propylene was produced in the presence of a catalyst composition formed from palladium acetate, the anion of trifluoroacetic acid and 1,3-bis[di(2-methoxyphenyl)phosphino]propane. The melting point of the polymer was 217° C. and the polymer had a limiting viscosity number (LVN) of 1.7 when measured in m-cresol at 60° C.

ILLUSTRATIVE EMBODIMENT 1

A sample of Polymer A was blended with 0.3 wt% Irganox 1010 additive in a manner similar to one which involves adding 0.3% by weight of Ethanox 1010 to the polymer material. A slurry was formed of the additive and the same liquid used in the polymerization of polyketone Polymer A. The slurry was blended with the Polymer A in a conventional manner. Stirring, shaking and pouring the slurry over the dried polymer are typical conventional methods. The mixture of additive and polymer was then dried in a usual manner forming a powder. Drying typically is performed by decantation or filtration. The blend was then melt compounded and pellets were made.

Pellets were formed from the powder blend by pouring the polymer blend into a feeder attached to a twin screw extruder. The polymer was starve fed (feeding at less than the capacity of the feeder) into the extruder using an extruder speed of around 250 rpm. The extruder was run at a temperature between about 190° C. to 285° C.; and an extruded strand was formed. The resulting extruded strand was quenched in water at room temperature, then fed into a chopper to form pellets. Pellets were then formed into molded plaques 4"×4"×0.05" using conventional techniques. The plaques were plaque-machined to a thickness of about 15 mil. This plaque sample, referred to hereafter as Sample A, was placed in a steel reaction vessel. The vessel was purged with nitrogen, then a 1% by volume flourine gas, having 99% by volume nitrogen was introduced into the chamber and the sample was treated with the gas mixture for 10 hours. After the gas treatment, the vessel was again purged with nitrogen, after which Sample A was removed. Sample A was then tested for oxygen, carbon dioxide, and water permeability, using Mocon TM equipment and standard permeability tests described in the ASTM procedure known as E96-63T. The permeability results appear on Table 1.

ILLUSTRATIVE EMBODIMENT 2

A sample of Polymer A was prepared with stabilizer and formed into plaques in the manner as described in Illustrative Embodiment 1. This sample was treated with the same gas using the same fluorination process as in Illustrative Embodiment 1, except that, the reaction time was 24 hours instead of 10 hours.

This sample, referred to hereafter as Sample B, was tested in a manner identical to Sample A and the test results appear on Table 1.

ILLUSTRATIVE EMBODIMENT 3

A sample of Polymer B was prepared without additional additive, formed into plaques and fluorinated in a manner and with the same gas as in Illustrative Embodiment I, except that the reaction time was 36 hours. This sample, referred to hereafter as Sample C, was tested in a manner identical to Samples A and B and the test results appear on Table 1.

TABLE 1

| | Gas Treatment: 1% $F_2$ + 99% $N_2$ | | | | | |
|---|---|---|---|---|---|---|
| | $O_2$[1] | | $CO_2$[1] | | $H_2O$[3] | |
| | Before | After | Before | After | Before | After |
| Sample A | 3.65 | 5.6 | 18.7 | 41.6 | 20.0 | 1.29 |
| Sample B | 4.72 | 1.15 | 22.9 | 44.3 | 17.1 | 1.36 |
| Sample C | 2.7 | 1680 | 20.2 | 1749 | 13.6 | 0.94 |

[1]Barrier Units: cc.mil/100 sq. in. day atm, 30° C.
[2]Water Vapor Transmission rate unit:gm.mil/100 sq. in. day 100° F., 90% relative humidity.

It was found from the tests and data that the water vapor transmission rate for the polyketone polymer was substantially reduced after the polyketone polymer experienced fluorination.

As many widely different embodiments of this invention may be made without departing from the spirit and scope therefore, it is to be understood that this invention is not limited to the specific embodiments thereof except as defined in the claims.

What is claimed:

1. A process for fluorinating a linear alternating polymer of carbon monoxide and at least one ethylenically unsaturated hydrocarbon wherein said process comprises exposing a linear alternating polymer of carbon monoxide and at least one ethylenically unsaturated hydrocarbon to a gas mixture, wherein said gas mixture comprises 0.1-100% by volume fluorine and 0-99.9% by volume nitrogen at a temperature sufficient to cause a reaction between at least a portion of the polymer and the fluorine.

2. The process of claim 1, wherein said linear alternating polymer is of the formula

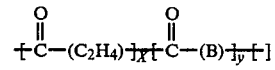

wherein B is the moiety of an ethylenically unsaturated α-olefin of at least 3 carbon atoms polymerized through the ethylenic unsaturation, the ratio of y:x is no more than about 0.5.

3. The process of claim 1, wherein said linear alternating polymer is of the formula

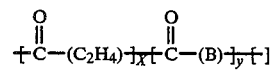

wherein B is the moiety of an ethylenically unsaturated α-olefin of at least 3 carbon atoms polymerized through the ethylenic unsaturation, and wherein group B of said linear alternating polymer is propylene, and the ratio of y:x is from about 0.01 to about 0.2.

4. The process of claim 2, wherein said linear alternating polymer comprises a second ethylenically unsaturated hydrocarbon.

5. The process of claim 2 wherein said linear alternating polymer is modified such that y is zero.

6. The process of claim 1, wherein said gas mixture comprises 1 to 10% by volume of fluorine gas.

7. The process of claim 1, wherein said polymer is blended with up to 5% by weight of an additive prior to exposure to said gas mixture.

8. A process for fluorinating a linear alternating polymer of carbon monoxide and at least one ethylenically unsaturated hydrocarbon wherein said process comprises the following steps:
(i) disposing a linear alternating polymer of carbon monoxide and at least one ethylenically unsaturated hydrocarbon in a chamber;
(ii) at least once, flushing said chamber with nitrogen;
(iii) at least once, exposing said polymer to a gas mixture thereby forming a treated polymer using a temperature sufficient to cause a reaction and wherein said mixture comprises a nitrogen and a fluorine gas, and wherein said fluorine gas is present in amounts up to 100% by volume based on the total volume of the gas mixture;
(iv) at least once after exposing said polymer to said gas mixture, flushing said chamber with nitrogen; and
(v) removing said treated polymer from said chamber.

9. The process of claim 8, wherein said linear alternating polymer is of the formula

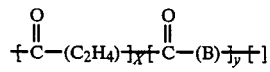

wherein B is the moiety of an ethylenically unsaturated α-olefin of at least 3 carbon atoms polymerized through the ethylenic unsaturation, the ratio of y:x is no more than about 0.5.

10. The process of claim 9, wherein said linear alternating polymer is modified such that y is zero.

11. The process of claim 8, wherein said polymer is blended with up to 5% by weight of an additive prior to exposure to said gas mixture.

12. An article prepared by a process comprising exposing a linear alternating polymer of carbon monoxide and at least one ethylenically unsaturated hydrocarbon to a gas mixture, for a period of time sufficient to cause a reaction between at least a portion of the polymer and the fluorine and wherein said gas mixture comprises 0.1–100% by volume fluorine and 0–99.9% by volume nitrogen, and further wherein said article has a water vapor transmission rate in the range of 0.5 to 5 gm. mil/100 sq. in. day at 100° F., at about 90% relative humidity.

13. The article of claim 12, wherein said process includes the additional step of blending said polymer with up to 5 wt% of an additive prior to exposing said polymer to said gas mixture.

14. An article prepared by the process of claim 2.

15. An article prepared from a process which comprises exposing a linear alternating polymer of carbon monoxide and at least one ethylenically unsaturated hydrocarbon to a gas mixture, wherein said gas mixture comprises 0.1–100% by volume fluorine and 0–99.9% by volume nitrogen and wherein said process comprises the following steps:
   (i) disposing a linear alternating polymer of carbon monoxide and at least one ethylenically unsaturated hydrocarbon in a chamber;
   (ii) at least once, flushing said chamber with nitrogen;
   (iii) at least once, exposing said polymer to a gas mixture, thereby forming treated polymer using a temperature sufficient to cause a reaction and wherein said mixture comprises a nitrogen and a fluorine gas, and wherein said fluorine gas is present in amounts up to 100% by volume based on the total volume of the gas mixture;
   (iv) at least once after exposing said polymer to said gas mixture, flushing said chamber with nitrogen; and
   (v) removing said treated polymer from said chamber.

16. The article of claim 15 wherein said process further comprises blending said polymer with up to 5% by weight of an additive prior to disposing said polymer in said chamber.

17. A laminar structure comprising a substrate and a treated polymer wherein said treated polymer is produced by a process comprising: exposing a linear alternating polymer of carbon monoxide and at least one ethylenically unsaturated hydrocarbon to a gas mixture for a period of time sufficient to cause a reaction between at least a portion of the polymer and the fluorine, and wherein said gas mixture comprises 0.1–100% by volume fluorine and 0–99% by volume nitrogen, thereby forming a treated polymer.

18. The laminar structrue of claim 17, wherein said substrate is selected from a group consisting of polypropylene, aluminum, polyester, and polybutylene.

19. The laminar structure of claim 17, wherein said treated polymer is produced by a process comprising the additional step of blending said polymer with up to 5 wt% of an additive prior to exposing said polymer to said gas mixture.

* * * * *